United States Patent
Mital et al.

(10) Patent No.: US 8,640,083 B2
(45) Date of Patent: *Jan. 28, 2014

(54) TIME BUSINESS PROCESS VALIDATIONS WITHIN DATA CONTEXT

(75) Inventors: Vijay Mital, Sammamish, WA (US);
Maria Belousova, Seattle, WA (US);
Gueorgui B. Chkodrov, Redmond, WA (US); Chandrika G. Shankarnarayan, Seattle, WA (US); Gregory Robert Prickril, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 126 days.

This patent is subject to a terminal disclaimer.

(21) Appl. No.: 13/081,242

(22) Filed: Apr. 6, 2011

(65) Prior Publication Data
US 2011/0185338 A1 Jul. 28, 2011

Related U.S. Application Data

(63) Continuation of application No. 11/279,547, filed on Apr. 12, 2006, now Pat. No. 7,945,891.

(51) Int. Cl.
*G06F 9/44* (2006.01)
(52) U.S. Cl.
USPC ............................ 717/101; 717/124; 717/131
(58) Field of Classification Search
USPC .......................... 717/100, 124–135; 705/317
See application file for complete search history.

(56) References Cited

U.S. PATENT DOCUMENTS

| | | | |
|---|---|---|---|
| 5,216,592 | A | 6/1993 | Mann et al. |
| 5,634,127 | A | 5/1997 | Cloud et al. |
| 5,734,837 | A | 3/1998 | Flores et al. |
| 6,411,961 | B1 | 6/2002 | Chen |
| 6,621,505 | B1 | 9/2003 | Beauchamp et al. |
| 6,662,188 | B1 | 12/2003 | Rasmussen et al. |
| 6,708,186 | B1 | 3/2004 | Claborn et al. |
| 6,772,180 | B1 | 8/2004 | Li et al. |
| 6,820,118 | B1 | 11/2004 | Leymann et al. |
| 6,862,601 | B2 | 3/2005 | Doney et al. |
| 6,895,438 | B1 | 5/2005 | Ulrich |

(Continued)

FOREIGN PATENT DOCUMENTS

| | | |
|---|---|---|
| JP | 11-259578 | 9/1999 |
| JP | 2004-240766 | 8/2004 |
| JP | 2004-280821 | 10/2004 |

OTHER PUBLICATIONS

Schultz et al., Executable Description and Validatioonf SNA, 1980 IEEE, pp. 661-677.*

(Continued)

*Primary Examiner* — Satish Rampuria
(74) *Attorney, Agent, or Firm* — Senniger Powers LLP

(57) ABSTRACT

Validating executable data for interactions among a plurality of process artifacts at design time. A data context is created to include the plurality of process artifacts. The data context carries interaction rules among the plurality of process artifacts. The executable data from a data source is associated with the plurality of process artifacts in the created data context. A subset of the interaction rules is selected corresponding to at least one of the plurality of process artifacts. The associated executable data is validated when the associated executable data is in accordance with the selected subset of the interaction rules.

17 Claims, 10 Drawing Sheets

(56) References Cited

U.S. PATENT DOCUMENTS

| | | | |
|---|---|---|---|
| 6,898,790 | B1 | 5/2005 | Cheong et al. |
| 6,910,204 | B1 | 6/2005 | Rossomando |
| 7,013,289 | B2 * | 3/2006 | Horn et al. ................. 705/14.51 |
| 7,233,952 | B1 | 6/2007 | Chen |
| 7,383,255 | B2 | 6/2008 | Desai et al. |
| 7,590,644 | B2 | 9/2009 | Matsakis et al. |
| 7,610,575 | B2 | 10/2009 | Sproule |
| 8,447,859 | B2 * | 5/2013 | Bobak et al. ................. 709/226 |
| 2002/0046072 | A1 | 4/2002 | Arai et al. |
| 2002/0065745 | A1 * | 5/2002 | Rainsberger et al. ........... 705/27 |
| 2003/0023604 | A1 | 1/2003 | O'Brien et al. |
| 2003/0033180 | A1 | 2/2003 | Shekar et al. |
| 2003/0084127 | A1 | 5/2003 | Budhiraja et al. |
| 2003/0181991 | A1 | 9/2003 | Chau et al. |
| 2003/0208392 | A1 | 11/2003 | Shekar et al. |
| 2003/0217053 | A1 | 11/2003 | Bachman et al. |
| 2004/0098358 | A1 | 5/2004 | Roediger |
| 2004/0133876 | A1 * | 7/2004 | Sproule ......................... 717/105 |
| 2004/0162741 | A1 | 8/2004 | Flaxer et al. |
| 2004/0172409 | A1 | 9/2004 | James |
| 2004/0220910 | A1 | 11/2004 | Zang et al. |
| 2004/0260593 | A1 | 12/2004 | Abraham-Fuchs et al. |
| 2005/0050311 | A1 | 3/2005 | Joseph et al. |
| 2005/0071347 | A1 | 3/2005 | Chau et al. |
| 2005/0096937 | A1 | 5/2005 | Subash et al. |
| 2005/0125438 | A1 | 6/2005 | Krishnaswamy et al. |
| 2005/0131751 | A1 | 6/2005 | Ahlers et al. |
| 2005/0154628 | A1 | 7/2005 | Eckart et al. |
| 2005/0216482 | A1 | 9/2005 | Ponessa |
| 2005/0216507 | A1 | 9/2005 | Wright |
| 2005/0262112 | A1 | 11/2005 | Moore |
| 2006/0004845 | A1 | 1/2006 | Kristiansen et al. |
| 2006/0010067 | A1 | 1/2006 | Notani et al. |
| 2006/0053120 | A1 | 3/2006 | Shum et al. |
| 2006/0069596 | A1 | 3/2006 | Hatoun et al. |
| 2006/0069605 | A1 | 3/2006 | Hatoun |
| 2006/0074736 | A1 * | 4/2006 | Shukla et al. ..................... 705/8 |
| 2006/0122872 | A1 | 6/2006 | Stevens et al. |
| 2006/0143193 | A1 | 6/2006 | Thakkar et al. |
| 2006/0241997 | A1 | 10/2006 | Bhatawdekar et al. |
| 2006/0253831 | A1 * | 11/2006 | Harper et al. ................. 717/106 |
| 2006/0271390 | A1 * | 11/2006 | Rich et al. ......................... 705/1 |
| 2006/0277166 | A1 | 12/2006 | Vogler-Ivashchanka et al. |
| 2007/0107052 | A1 | 5/2007 | Cangini et al. |
| 2007/0174810 | A1 * | 7/2007 | Hockenberry et al. ....... 717/101 |
| 2007/0179790 | A1 * | 8/2007 | Leitch et al. ..................... 705/1 |

OTHER PUBLICATIONS

Balci, Verification, Validation and Accreditation of Simulation Models, 1997 Winter Simulation Conference, pp. 135-141.*

Gulla et al., Advanced Information Systems Engineering Lecture Notes in Computer Science, 1993, vol. 685/1993, pp. 118-142.*

Author Unknown, "Products—PA: Enterprise Hub", printed Feb. 13, 2006, 2 pages, http://www.proactivityinc.com/products/platform.htm, ProActivity, Inc., USA.

Augusto, J. et al, "Model-Based Approaches for Validating Business Critical Systems", IEEE Xplore 2004, 9 pages.

Perkins, Alan,"Business Rules = Meta-Data," In: Proceedings of the Technology of Object-Oriented Languages and Systems, 2000, pp. 285-294.

Pivk, Aleksander et al., "Intelligent Agents in E-Commerce," Electronic Review Slovenia, Pub 2000, 18 pages.

Serrano, Manuel et al., "Experimental Validation of Multidimensional Data Models Metrics", IEEE Xplore 2002, 7 pages.

Sooksanan, Parnu et al., "Validation Rules for Exporting Business Process Diagram to Business Process Execution Language", Proceedings of the Fourth International Conference on eBusiness, Nov. 19-20, 2005, Bangkok, Thailand, 6 pages.

Speck, Andreas et al., "Validation of Business Process Models", last modified Jul. 15, 2003, 9 pages, http://ssel.vub.ac.be/workshops/ECOOP2003/papers/speckCMC03.pdf, Germany.

Yu, Eric, S.K. et al., "Al Models for Business Process Reengineering", Enterprise Modeling, Aug. 1996, 8 pages, http://ieeexplore.ieee.org/iel3/64/11141/00511773.pdf?tp_&arnumber=1114&htry=2, IEEE Expert, USA.

* cited by examiner

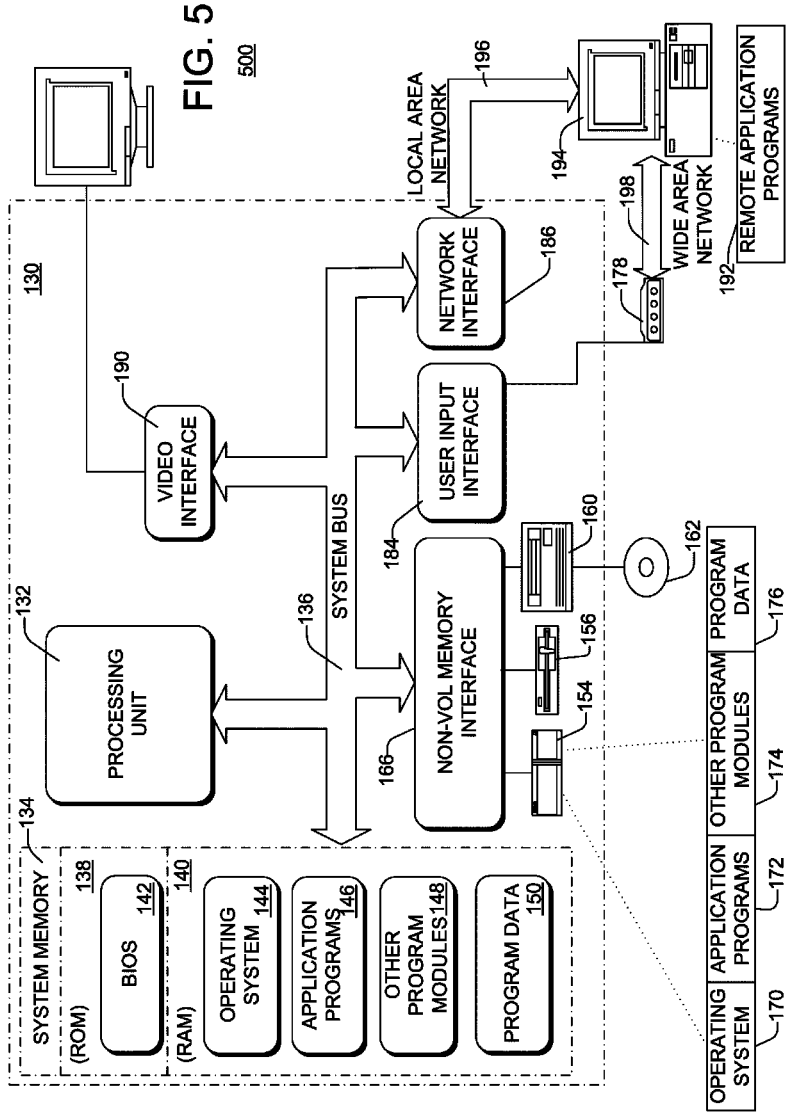

TIME BUSINESS PROCESS VALIDATIONS WITHIN DATA CONTEXT

CROSS-REFERENCE TO RELATED APPLICATION(S)

This application is a continuation of U.S. Ser. No. 11/279,547, filed Apr. 12, 2006, now U.S. Pat. No. 7,945,891, the entire contents of which are incorporated herein by reference.

BACKGROUND

Business Process Design (BPD) targets the structuring of activities or tasks within a business with the goal of producing an intended outcome of value to its users or customers. BPD can be performed on various different levels of abstraction targeting a spectrum different of users spanning from roles such as business analysts, business subject-matter experts, business data managers, developers, testers, administrators, IT professionals, etc.

For example, from a business perspective, defining process steps, roles assigned to these steps and the order of these can be the focus of one point of view. Defining specifically the connection of the process and its activities to sources of data, required data transformations, detailed control and data flow, output data, or the like may be the focus of another, such as an IT oriented view of the process definition. Each presentation caters to a different target audience or persona.

In current BPD practices, the common problem is that business analysts today often perform the process design "in a vacuum"; i.e. disconnected from actually executing process and the existing IT artifacts that enable their execution. This main problem lies in the missing common vocabulary between the business users and IT developers. These typical practices limit their ability to trace process designs from a business level concept down to code and deployment artifacts. They also prevent business users from directly affecting changes to existing process designs—be it on process instance or process type level.

For example, typical problems that frequently occur but need to be prevented through appropriate guidance of the process design are: (1). missing data or process artifact; (2). a required entity for the implementation of a task is not available in its data context; (3). an ambiguous entity; (4). a required entity is available, but with multiple instances; (5). the appropriate instance needs to be selected or disambiguated; (6). a conflicting entity; (7). a specific instance is available in the data context but violates a certain constraint against the availability of another entity; (8). only conditionally or optionally available entity; (9). if a certain entity can only be acquired into the data context by performing a task on a conditional path of the workflow, then subsequent tasks operating on the respective entity need to be flagged as potentially incomplete; or (10). authorization and access levels constraints.

Using a simple illustration, suppose a user assigns an order from a customer in region B to a manager$_1$ in region A after the order is received. In order for the manager$_1$ in region A to handle and process the order from region B, the manager$_1$ needs to obtain an authorization from a manager$_2$ at the sales department in region B. However, when the user assigns this order to manager$_1$, the user failed to include an activity such as "obtaining authorization from manager$_2$" in the workflow context. Without any alert or error message, the user would assume what he has done would seamlessly be executed. However, during the execution and when the manager$_1$ receives such task, the manager) could not proceed further without the authorization. As such, the entire workflow would require additional exception handling and reconfiguration.

While the existing application programs facilitate the creation of such workflow context, these programs usually fail to indicate if there is anything wrong or incomplete among the different tasks or the individuals involved during design time. The existing implementations of process-oriented programs typically fail to indicate whether the tasks may be performed until when the workflow is in execution. Typically, the existing application programs permit the users to design such workflow activities, and the users would only find that parts of the workflow could not be completed because of missing information during execution time. In addition, in order to accomplish such validations, the user is required to model the data flow on top of the control flow. Typically, this leads to a level of technical complexity that goes beyond the typical business user expectation. Other systems or application programs would merely attempt to ensure that the data used is always consistent during the manipulation of data.

SUMMARY

Embodiments of the invention overcome the shortfalls of existing implementations by validating data used in a given data context during design time of the process. Embodiments of the invention enhance the design of process-oriented activities by evaluating the data needed for execution among a plurality of process artifacts during design-time such that the users may construct the process-oriented activities without the fear of encountering missing data at later stages. Aspects of the invention promote efficient design and construction of data-aware processes while providing users with complete and comprehensive view of the data context during the design stage.

In addition, aspects of the invention monitor or keep track of how various process artifacts (such as tasks, events, roles and forms) output or bring in data into a data context. Alternative embodiments of the invention also determine whether a particular process artifact needs additional data more than available in the current data context in order to complete its operation. Implementations of the invention check the validity of process models on a business level.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

FIG. 5 is a block diagram illustrating one example of a suitable computing system environment in which the invention may be implemented.

Corresponding reference characters indicate corresponding parts throughout the drawings.

DETAILED DESCRIPTION

Figure 1:
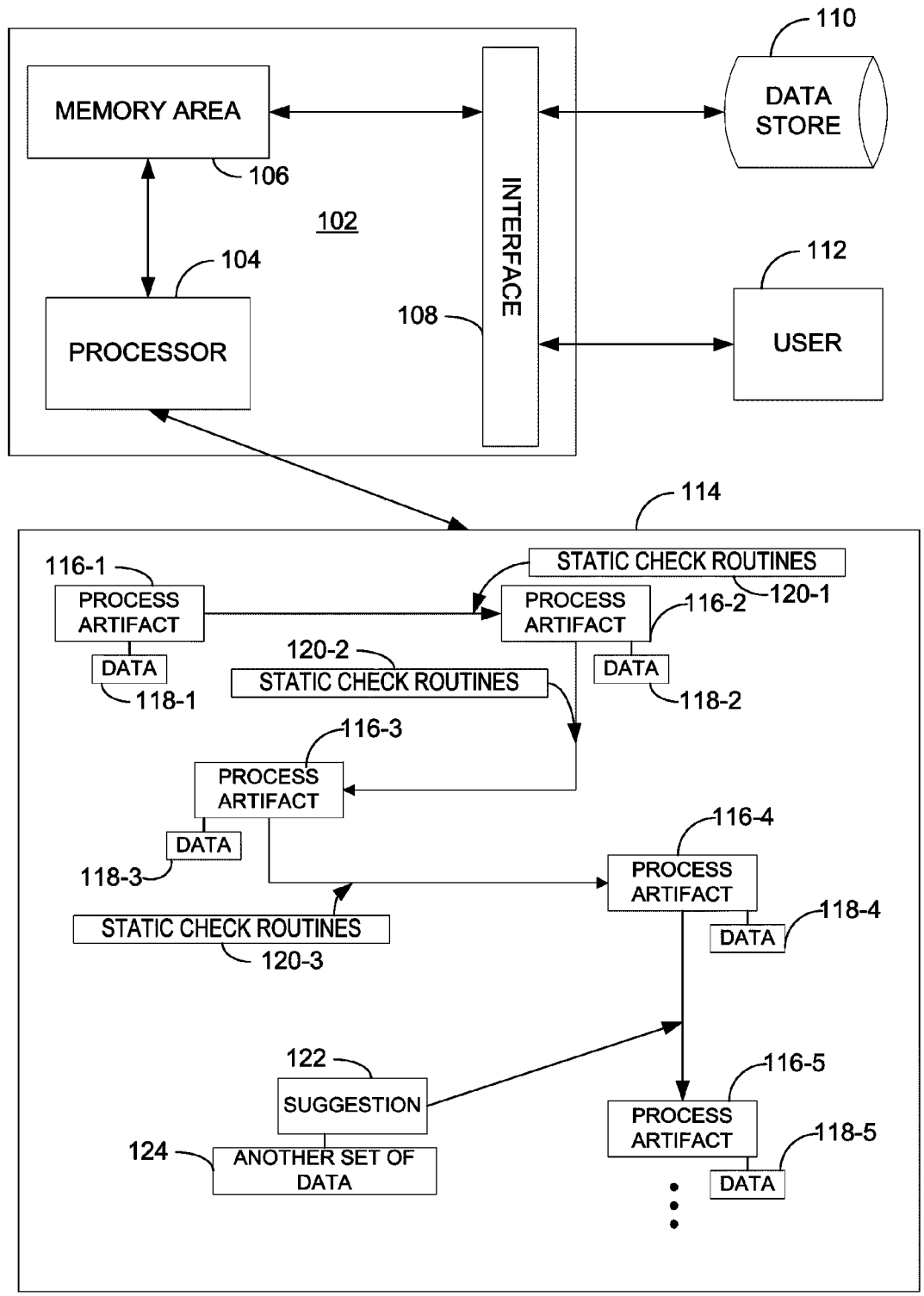
FIG. 1 is a block diagram illustrating a system for validating data for interactions among a plurality of process artifacts during design time according to an embodiment of the invention.

Referring first to FIG. 1, a block diagram illustrates a system 100 for validating data for interactions among a plurality of process artifacts. The system 100 includes a computing device 102, which may be a computer or a server computer capable of serving one or more client computers connected via a communications network (not shown). In one embodiment, the computing device 102 may include a collection of computers in a distributed computing configuration where one or more computers collectively and/or individually serve one or more client computers connected via wire or wireless means. In one example, the computing device 102 may be a computer 130 of FIG. 5.

The computing device 102 includes a processor 104, which may be a processing unit, a collection of processing units or the like for execute computer-executable instructions, codes, and routines. In one example, the processor 104 may be processing units 132 in FIG. 5. The computing device 102 also includes a memory area 106 for storing data.

Initially, the processor 104 executes an application program embodying aspects of the invention and permits a user 112 to create or generate a data context 114 defined by a set of process-oriented instructions and activities. In creating such data context 114, the user 112 may wish to input data via an interface 108 (e.g., a user interface (UI) or a communications interface) associated with the data context 114 in order to accomplish the tasks for the user 112. In one embodiment, the scope of the data context 114 changes depending on the set of process-oriented instructions, activities, or artifacts that the user 112 created. In another embodiment, the interface 108 may present to the user 112 a form which includes a set of various operations, functions, or other artifacts that the user 112 may operate or interact to command the processor 104 in creating the data context 114.

As such, the processor 104 creates the data context 114 including a plurality of process artifacts 116 according to the configuration or specification from the user 112. For example, the data context 114 may include a data from a workflow diagram relating to a purchase order processing. The data context 114 may also include data from a flow chart listing a sequence of tasks explaining accounting procedures or the like.

The plurality of process artifacts 116 defines what goes in the data context 114. For example, data context 114 based on a workflow may include process artifacts such as tasks (e.g., a logical unit of work), entities (a class of information with a business meaning (e.g., customer ID)), a role (e.g., an individual who performs a task), or the like. On the other hand, data context 114 based on accounting may include process artifacts such as regular provisions, calculation algorithms, accounting rules, or the like. As such, within the created or generated data context 114, the process artifacts carry, include, or incorporate a set of interactions rules or expressions among the process artifacts. For example, in the workflow, a sales department clerk must receive an approval from a manager in the same region before accepting a purchase order with a quantity over 1,000 units of goods. Similarly, in accounting, an accountant must retrieve an instance of regulatory legal provisions before proceeding to perform calculation algorithms. Those skilled in the art would appreciate other types of interaction rules or expressions may be defined or included in the data context 114 without departing from the scope of the invention.

In one embodiment, the processor 104 receives input or instructions via the interface 108 from the user 112 for defining the data context 114. In an alternative embodiment, the processor 104 defines the data context 114 according to a pre-defined set of data stored in the memory area 106, a data store 110, or other storage device coupled to the computing device 102.

Still referring to FIG. 1, the processor 104 associates data 118 from the data source 110 with a plurality of process artifacts 116 in the data context 114. In the example of the workflow data context above, the processor 104 may associate data 118 such as a collection of customer ID numbers from a database, a spreadsheet listing purchase orders, electronic data interchange (EDI) documents, a list of emergency suppliers, or the like with a number of process artifacts 116. In another embodiment, the data 118 may include executable data (e.g., information to be used as input, entities, or arguments to an executable expression) or executable expressions. For example, the executable data or expression may be computer-executable instructions or functions, scripts, or the like. In an alternative embodiment, the data 118 may include metadata exposed or presented to the plurality of process artifacts 116 the data context 114 such that the processor 104 evaluates and/or processes the metadata within the data context 114.

The processor 104 also selects a set or subset of interaction rules corresponding to at least one of the plurality of process artifacts. Using the workflow data context 114 as an example, the processor 104 associates or identifies data or executable data relating to managers in region A, instead of region B, for handling purchase orders in region A based on the selected interaction rules (e.g., managers in region A handles purchase orders in region A). Once the data is associated and the interaction is selected, the processor 104 validates the associated executable data for the process artifacts 116 when the associated executable data is in accordance with the selected interaction rules. FIGS. 2A to 2F depict an exemplary data context to illustrate this implementation.

Figure 2A:
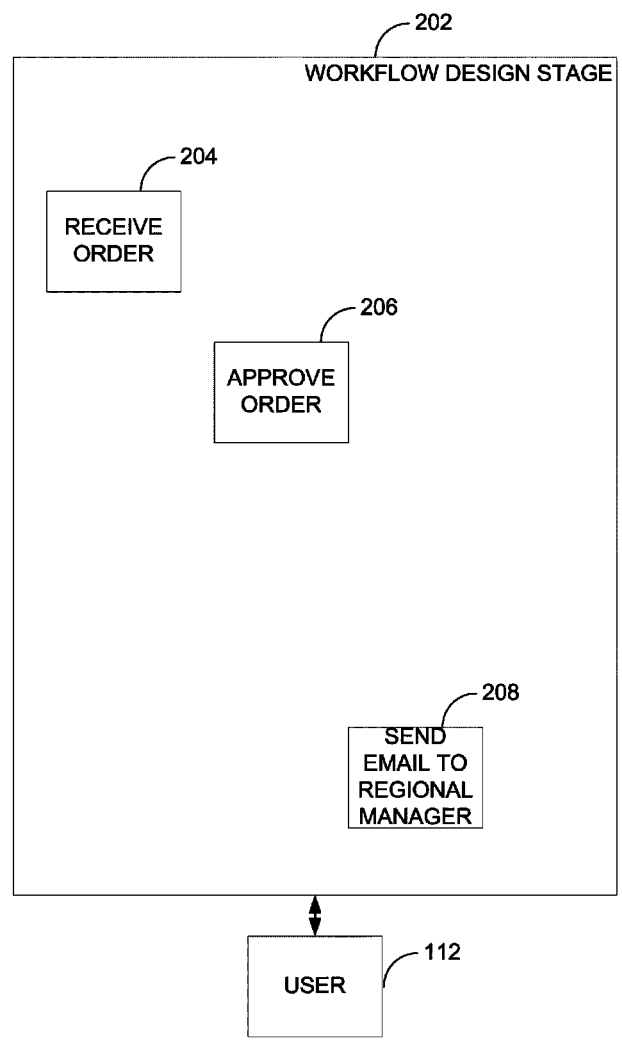
FIGS. 2A to 2F are exemplary diagrams illustrating a process of validating data for interaction among a plurality of process artifacts in a workflow context according to an embodiment of the invention.
Figure 2B:
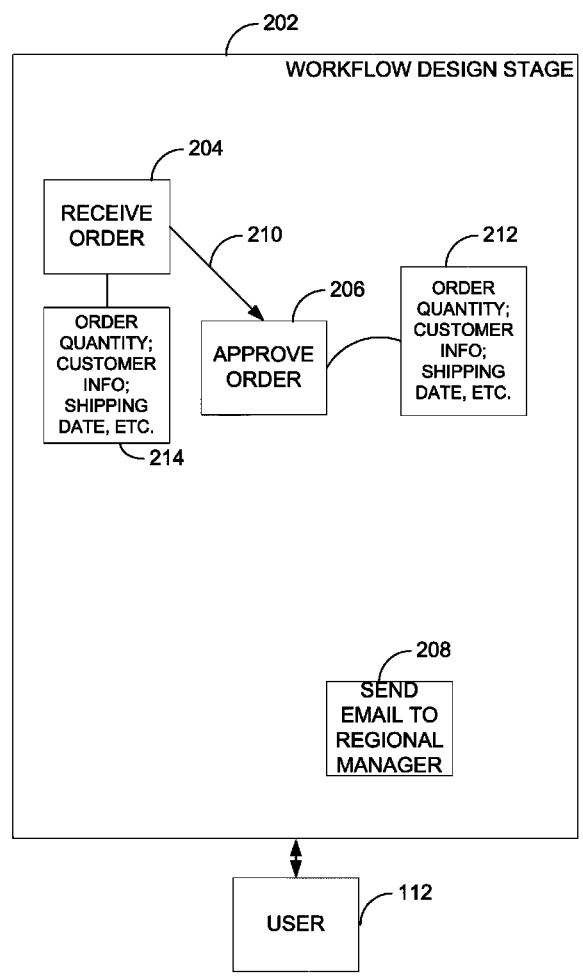
Figure 2C:
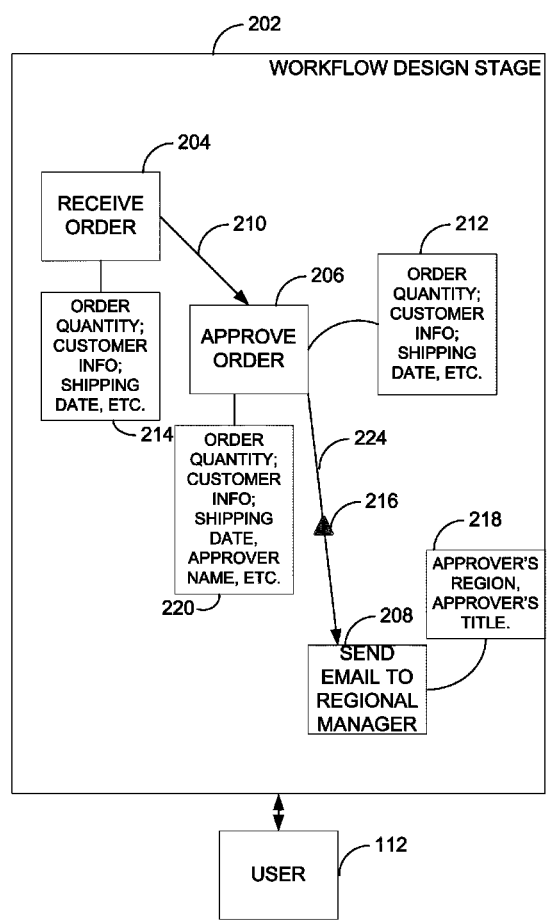
Figure 2D:
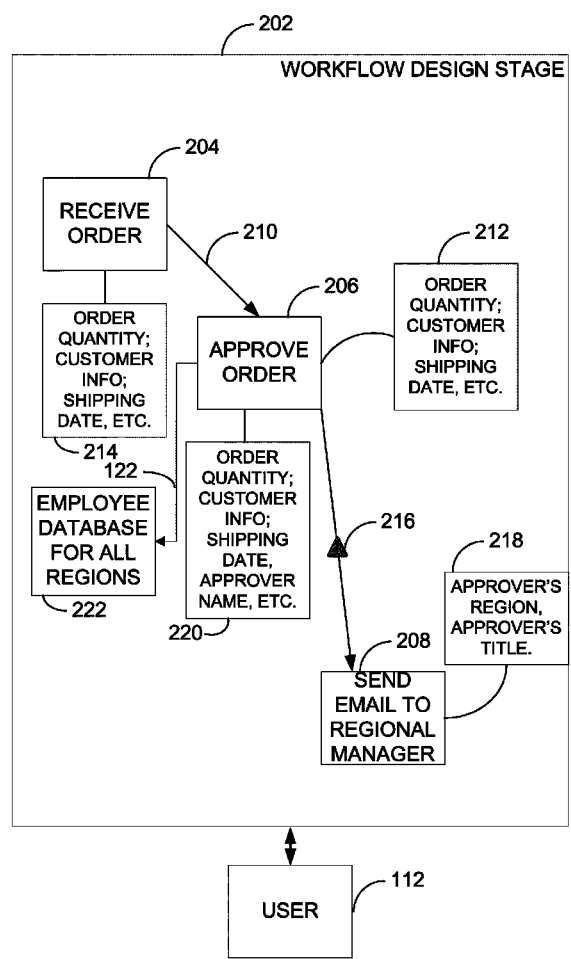
Figure 2E:
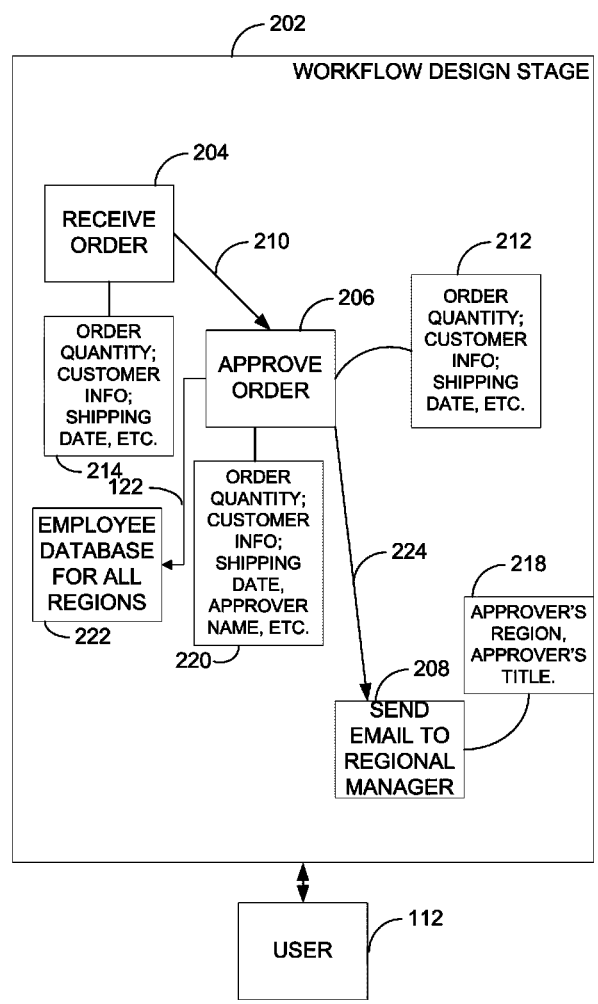
Figure 2F:
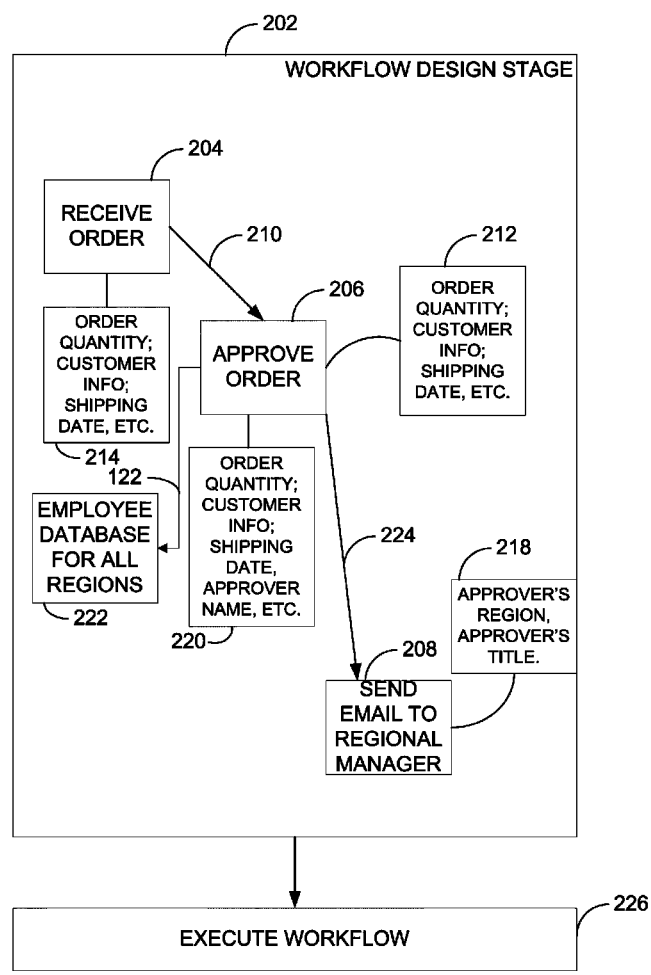

Referring now to FIGS. 2A and 2F, a series of diagrams illustrates validating data for process artifacts (e.g., process artifacts 116) in a data context 202 according to an embodiment of the invention. In particular, FIG. 2A shows a purchase order workflow data context 202 in its design stage. In this example, the user 112 may design the process to include three tasks: a "receive order" task 204, an "approve order task" 206, and a "send email to regional manager" task 208.

In FIG. 2B, an interaction rule 210 between the "receive order" task 204 and the "approve order" task 206 is defined. For example, the "receiver order" task includes a set of associated or collected data or entity: order quantity, customer information, shipping date, or the like. On the other hand, to complete the "approve order" task 206, a set of data or entities is required: order quantity, customer information, shipping date, etc. As such, the interaction rule 210 indicates that in order to perform and complete the "approve order" task 206, such artifact needs entities or data such as order quantity, customer information, shipping date, or the like. In this instance, because the "receive order" task 204 outputs or includes the required data/entity for "approve order" task 206, the processor 104 validates the collected data for the two tasks 204 and 206 as a function of the interaction rule. Also, as the associated data is in accordance with the interaction rules, the data is validated.

Referring now to FIG. 2C, the user 112 continues this workflow and designs the next task, "send email to regional manager" task 208. From FIG. 2B, the data context 114 indicates that the "approve order" task 204 includes data relating to order quantity, customer information, shipping date, approver's name, and the like. However, the "send email to regional manager" task 208 requires entity or data such as "approver's region, approver's title" in order to complete the task 208. As such, an interaction rule or expression 224 between tasks 206 and 208 indicates that the data relating to "approver's region, approver's title" is required to complete the task 208. However, the associated data with the "approve order" task 204 is not in accordance with or insufficient for such data or entities because it includes order quantity, customer information, shipping date, approver's name, and the like. Therefore, in validating the data, the processor 104 notifies the user 112, such as by using an alert icon 216 or other audible or visual notification or alert, that there is insufficient or inaccurate information to complete the task 208 or that the data is not in accordance with the interaction rules.

By validating and notifying the user 112 of such error during design time, instead of during execution time, embodiments of the invention provide the user 112 with a comprehensive set of information and pictures of what is necessary in order to complete a given set of tasks in a workflow or process based on the available data context. In one embodiment, the processor 104 performs a set of static check routines 120 to determine whether the associated executable data is in accordance with the selected interaction rules. For example, the static check routines may include validation of general structural design constraints, such as specific inconsistent workflow patterns, indefinite loop structures, defining the minimum set of properties that have to be specified on the various design artifacts (such as a human task must always be assigned at minimum to a role as an owner of the task completion).

In yet another embodiment, the static check routines include a process validation which focuses on the availability of required resources, specifically of data resources (entities). For example, the static check routines may verify, monitor, track, or determine whether all the required entities that an assigned action assumes as input, have been made available for the data context of the respective task or process artifact that the action has been assigned to. Similarly, when designing a branching decision within a workflow, the condition implementing the decision requires the availability of specific entities in order to evaluate the condition expression.

Even though a given process artifact has been accumulated in the data context, the assigned role for performing the task relating to the process artifact may not have appropriate access privileges to access or update the process artifact as required. Aspects of the invention also provide a warning or notification about missing access rights.

Based on the problem classification, appropriate user guidance with recommendations or suggestions for resolving the detected difficulties can be provided to the user 112 during design time to complete all the necessary tasks or activities in the process.

In yet another alternative embodiment, the processor 104 provides a suggestion 122 or a recommendation to supplement the associated executable data or data as a function of the selected interaction rules. For example, in FIG. 2D, after it is determined that given the state of the workflow (i.e., the user 112 has completed up to the task 206), the user 112 could not proceed to complete the task 208 due to insufficient or missing data or information. This missing information or entity, however, may be found in a database including all information relating to employees. As such, the processor 104 makes the suggestion 122 to query for employee information data (e.g., employee database), and identifies another set 122 of data or executable data, "employee database for all regions," for solving the current situation. For example, the processor 104 is able to retrieve or collect the approver's region that is associated with the approver and the approver's title, because the processor 104 is able to use the "approver's name" data provided by the "approve order" task 206. In another embodiment, the processor 104 may collect or identify another set of data as a function of validating and without first presenting or providing the suggestion 122 to the user 112.

In an alternative embodiment, the suggestion 122 from the processor 104 may include adding a task with a particular kind of input, changing or altering a form to allow certain inputs from the data source 110 or the user 112, choosing and pre-correlating a particular entity or entity instance, or the like.

After adding the entity 222, in FIG. 2E, the user 112 shown in FIG. 2D now has the necessary data as an input for the task 208. As such, the alert icon 216 shown in FIG. 2D is removed in FIG. 2E. In FIG. 2F, the user 112 is now enabled to proceed to execute the workflow context 202 at 226.

It is to be understood that the exemplary workflow data context information illustrated in FIGS. 2A to 2F is used for demonstration purpose only and not limiting aspects of the invention. By validating a more comprehensive application/process model for data availability, embodiments of the invention efficiently provide a rich user experience in designing and constructing a process-oriented or process-centric activities and tasks while knowing the designed activities and tasks will be executed according to design. Aspects of the invention also provide meaningful suggestions and/or corrective steps that are understandable to a business-level modeler, rather than a programmer or a software developer who understands programming logics and construct.

Figure 3:
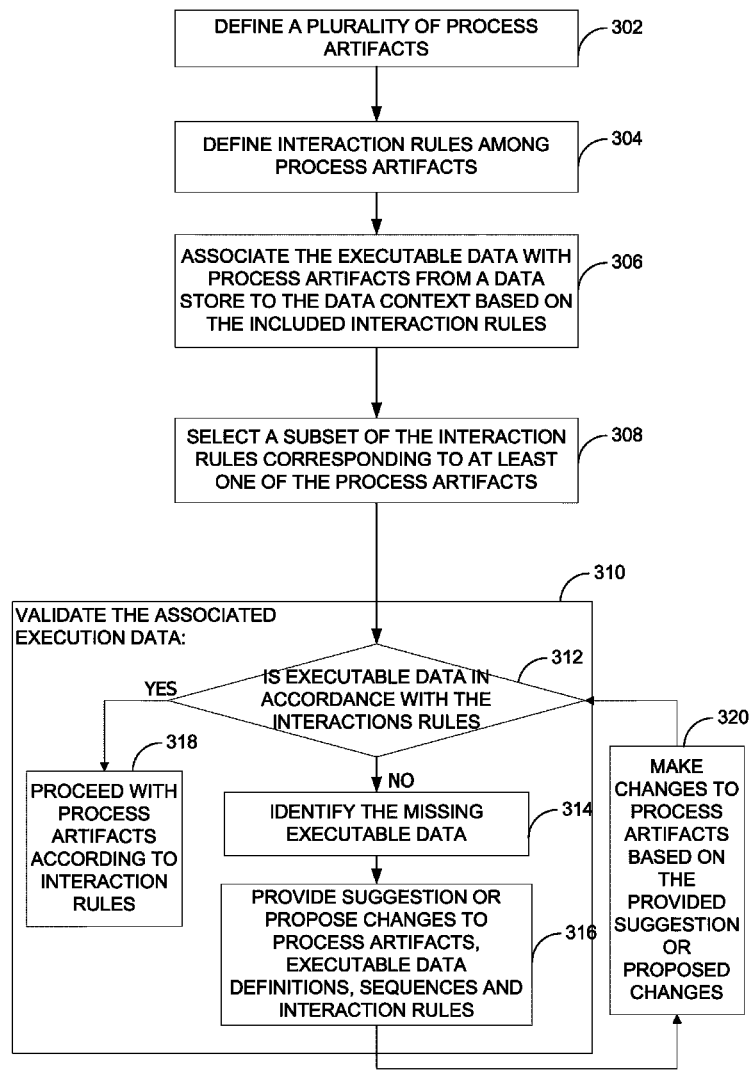
FIG. 3 is an exemplary flow chart illustrating operation of validating data for interactions among a plurality of process artifacts according to an embodiment of the invention.
Figure 4:
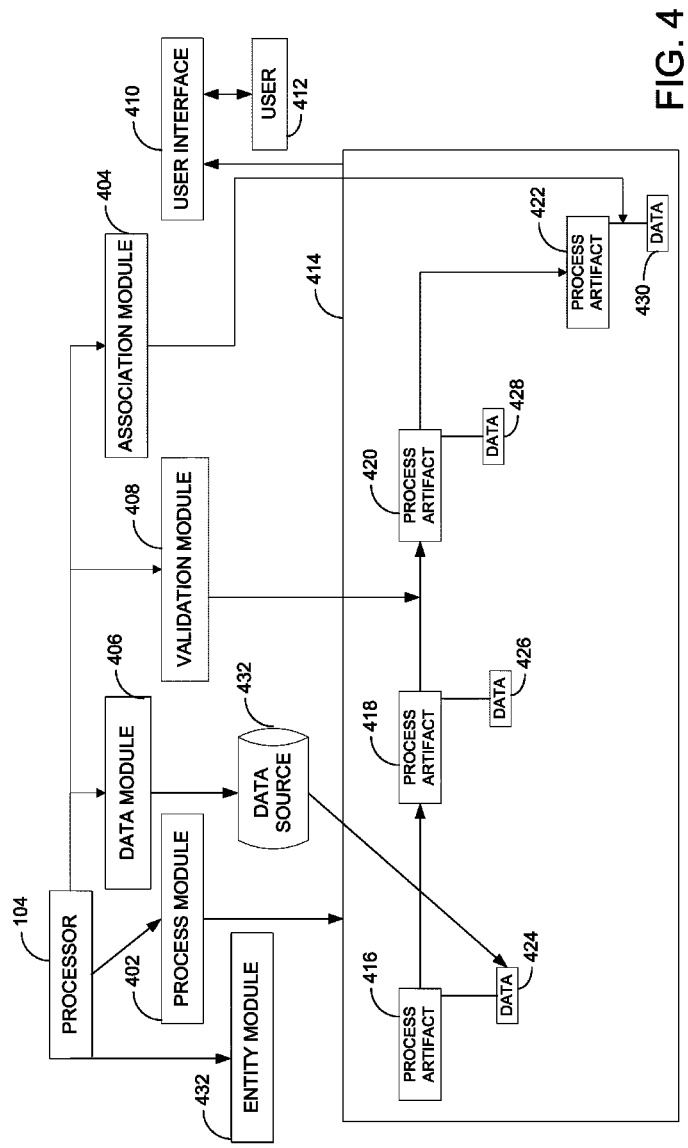
FIG. 4 is a block diagram illustrating an exemplary computer-readable medium on which aspects of the invention may be stored.

FIG. 3 is a flow chart showing a method for validating data for interactions among a plurality of process artifacts according to an embodiment of the invention. FIG. 4 is a block diagram illustrating an exemplary computer-readable medium 400 on which aspects of the invention may be stored. Initially, a plurality of process artifacts is defined at 302. A process module 402 creates a data context 414 including the plurality of process artifacts (e.g., 416, 418, 420, and 422). The data context carries or defines interaction rules among the plurality of process artifacts at 304. At 306, an association module 404 associates data/entity or executable data 428 from a data source 432 with the data context 414 based on the included interaction rules. At 308, a data module 406 selects a subset of the interaction rules corresponding to at least one of the plurality of process artifacts. At 310, a validation module 408 validates or monitors the associated executable data when the associated executable data is in accordance with the selected subset of the interaction rules.

At 312, if the validation module 408 determines that data or executable data is validated in accordance with the selected subset of the interactions, the process proceeds to 318 for continued process according to the data context 414 or user design. If the validation module 408 cannot validate the data (i.e., the executable is not in accordance with the selected subset of the interaction rules), the association module 404 identifies a set of missing executable data or another set of data at 314. At 316, the validation module 408 provides suggestions or proposes changes to a user 412 via a UI component 410 to the process artifacts in the data context 414. In one embodiment, the validation module 408 may further suggest changes to the interaction rules to the user 412. Alternatively, the validation module 408 may receive input from the user 412 to make changes to the process artifacts or the interaction rules based on the provided suggestion or the proposed changes at 320.

In yet another alternative embodiment, the computer-readable medium 400 also includes the UI component 410 for providing the suggestion to the user 412, and wherein the UI component 410 receives input from the user 412 in response to the provided suggestion. The UI component 410 may also receive input from the user 412 in creating the data context 414.

FIG. 5 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 5 illustrates operating system 144, application programs 146, other program modules 148, and program data 150.

The computer 130 may also include other removable/non-removable, volatile/nonvolatile computer storage media. For example, FIG. 5 illustrates a hard disk drive 154 that reads from or writes to non-removable, nonvolatile magnetic media. FIG. 5 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 5, provide storage of computer readable instructions, data structures, program modules and other data for the computer 130. In FIG. 5, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 5 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 5 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Aspects of the invention described herein includes these and other various types of computer-readable storage media when such media contain instructions or programs for implementing the steps described below in conjunction with a microprocessor or other data processor. Further, aspects of the invention include the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DOOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in the figures, (e.g., FIG. 3) to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method executable by a processor of a computing device for validating executable data for interactions among a plurality of process artifacts at design time, said processor being configured for executing computer-executable instructions for:
creating a data context based on the plurality of process artifacts, said data context including interaction rules among the plurality of process artifacts;
associating executable data with the plurality of process artifacts from a data source to the created data context based on the included interaction rules;
selecting a subset of the interaction rules corresponding to at least one of the plurality of process artifacts, said interaction rules defining sequences and interactions among the plurality of process artifacts;
validating the associated executable data before execution of the plurality of process artifacts in the data context when the associated executable data is in accordance with the selected subset of the interaction rules; and
providing a suggestion to supplement the associated executable data as a function of the selected subset of the interaction rules wherein the suggestion relates to data for completing at least one of the defined sequences and interactions.

2. The method of claim 1, wherein the processor is further configured for associating another set of executable data in accordance with the selected subset of the interaction rules in response to validating.

3. The method of claim 1, wherein the executable data includes data and expressions for execution by a processing unit.

4. The method of claim 3, wherein validating further comprises executing a set of static check routines for determining whether the associated executable data includes entities needed for the expressions to be executed by the processing unit.

5. The method of claim 1, wherein one or more computer-readable hardware storage devices store the computer-executable instructions of claim 1.

6. A method executable by a processor of a computing device for validating executable data for interactions among a plurality of process artifacts at design time, said processor being configured for executing computer-executable instructions for:
creating a data context based on the plurality of process artifacts, said data context including interaction rules among the plurality of process artifacts;
associating executable data with the plurality of process artifacts from a data source based on the included interaction rules;
selecting a subset of the interaction rules corresponding to at least one of the plurality of process artifacts;
validating the associated executable data before execution of the plurality of process artifacts in the data context when the associated executable data is in accordance with the selected subset of the interaction rules;
providing a suggestion to supplement the associated executed data as a function of the selected subset of the interaction rules; and
collecting another set of executable data for the plurality of process artifacts as a function of the provided suggestion when the collected set of the executable data is in accordance with the selected subset of the interaction rules.

7. A system for validating data interactions, said system comprising:
an interface for receiving data from a data source;
a memory area for storing the received data;
a processor being configured for executing computer-executable instructions for:
receiving data from the data source, said received data including executable data and executable expressions;
storing the received data;
creating a data context including a plurality of process artifacts, said data context including interaction rules among the plurality of process artifacts, said included interaction rules defining sequences and interactions among the plurality of process artifacts;
associating the received data with the plurality of process artifacts from the data source to the created data context based on the included interaction rules;
executing a set of static check routines for determining the availability of required data;
selecting a subset of the interaction rules corresponding to at least one of the plurality of process artifacts;
providing a suggestion to supplement the associated data as a function of the selected subset of the interaction rules wherein the suggestion relates to data for completing at least one of the defined sequences and interactions; and
validating the associated data when the associated data is in accordance with the selected subset of the interaction rules;
wherein the processor is configured to validate the associated data before execution of the plurality of process artifacts.

8. The system of claim 7, wherein the memory area stores data relating to the plurality of the process artifacts.

9. The system of claim 7, wherein said determining the availability of the required data comprises verifying, monitoring, or tracking associated data required for the data context.

10. The system of claim 7, further comprising receiving a condition evaluating the branching decision as a function of the determined availability of the required data and implementing the received condition.

11. The system of claim 7, wherein the interface provides the suggestion to a user, and wherein the interface receives input from the user in response to the provided suggestion.

12. A system for validating data interactions, said system comprising:
an interface for receiving data from a data source;
a memory area for storing the received data;
a processor being configured for executing computer-executable instructions for:
receiving data from the data source, said received data including executable data and executable expressions;
storing the received data;
creating a data context including a plurality of process artifacts, said data context including interaction rules among the plurality of process artifacts, said included interaction rules defining sequences and interactions among the plurality of process artifacts;
associating the received data with the plurality of process artifacts from the data source to the created data context based on the included interaction rules;

executing a set of static check routines for determining the availability of required data;

selecting a subset of the interaction rules corresponding to at least one of the plurality of process artifacts;

providing a suggestion to supplement the associated data as a function of the selected subset of the interaction rules;

validating the associated data when the associated data is in accordance with the selected subset of the interaction rules; and identifying a set of executable data in accordance with the selected subset of the interaction rules in response to validating or in response to the provided suggestion.

13. One or more computer-readable hardware storage devices having computer-executable components executable by a processor for validating data interactions among a plurality of process artifacts in a data context, said computer-executable components comprising:

a process module including instructions executable by the processor for creating a data context based on the plurality of process artifacts, said data context configuring interaction rules among the plurality of process artifacts; said configured interaction rules defining sequences and interactions among the plurality of process entities;

an association module including instructions executable by the processor for associating executable data with the plurality of process artifacts from a data source to the created data context based on the configured interaction rules;

a data module including instructions executable by the processor for selecting a subset of the interaction rules corresponding to at least one of the plurality of process artifacts; and a validation module including instructions executable by the processor for validating the associated executable data when the associated executable data is in accordance with the selected subset of the interaction rules, said validation module further configured to provide a suggestion to supplement the associated executable data as a function of the selected subset of the interaction rules, said suggestion comprising one or more of the following: adding a task, changing a form to permit additional input from the data source, changing a form to permit additional input from a user, and choosing a particular process entity from the plurality of process entities.

14. The computer-readable storage hardware devices of claim 13, wherein the validation module validates the associated executable data before execution of the plurality of process artifacts in the data context.

15. The computer-readable hardware storage devices of claim 13, wherein the associated executable data including executable data and executable expressions for execution by the process module, and wherein the validation module is configured to execute a set of static check routines for determining whether the associated executable data includes entities or parameters needed for the executable expressions to be executed by the process module.

16. The computer-readable storage hardware devices of claim 13, further comprising a user interface (UI) component for providing the suggestion to the user, and wherein the UI component receives the additional input from the user in response to the provided suggestion.

17. The computer-readable storage hardware devices of claim 13, wherein the association module is configured to identify another set of executable data as a function of the selected subset of the interaction rules in response to validating by the validation module or as a function of the provided suggestion by the validation module.

* * * * *

UNITED STATES PATENT AND TRADEMARK OFFICE
CERTIFICATE OF CORRECTION

PATENT NO. : 8,640,083 B2  
APPLICATION NO. : 13/081242  
DATED : January 28, 2014  
INVENTOR(S) : Vijay Mital et al.

It is certified that error appears in the above-identified patent and that said Letters Patent is hereby corrected as shown below:

On the title page, item (54) and in the Specification, Col. 1, Title:

"TIME BUSINESS PROCESS VALIDATIONS WITHIN DATA CONTEXT"
should read
--DESIGN-TIME BUSINESS PROCESS VALIDATIONS WITHIN DATA CONTEXT--.

Signed and Sealed this
Twenty-second Day of April, 2014

Michelle K. Lee
*Deputy Director of the United States Patent and Trademark Office*